United States Patent [19]
Ramakrishnan et al.

[11] Patent Number: 5,901,944
[45] Date of Patent: May 11, 1999

[54] COMPOSITE VALVE SEAL

[75] Inventors: M. R. Ramakrishnan, Cincinnati; Michael J. Sandling, Loveland; Steven M. Kirk, Cincinnati, all of Ohio

[73] Assignee: Xomox, Cincinnati, Ohio

[21] Appl. No.: 08/940,698

[22] Filed: Sep. 30, 1997

Related U.S. Application Data

[63] Continuation of application No. 08/582,304, Jan. 3, 1996, abandoned.

[51] Int. Cl.⁶ ........................................... F16K 5/02
[52] U.S. Cl. ........................ 251/304; 251/309; 251/358
[58] Field of Search ......................... 251/306, 358, 251/304, 309

[56] References Cited

U.S. PATENT DOCUMENTS

| | | | |
|---|---|---|---|
| 3,133,722 | 5/1964 | McGuire et al. | 251/358 X |
| 3,423,067 | 1/1969 | Foster | 251/309 |
| 3,526,386 | 9/1970 | Gachot | 251/358 X |
| 3,825,030 | 7/1974 | Kalsi . | |
| 4,175,578 | 11/1979 | Priese | 251/306 X |
| 4,289,296 | 9/1981 | Krause . | |
| 4,494,730 | 1/1985 | George . | |
| 4,817,662 | 4/1989 | Skibowski | 251/309 X |

OTHER PUBLICATIONS

Xomo—.Tufline Fully Lined Buterfly Valves., 1992.
Xomox—.Tuflin Easi–Sleeve Valves.
Flowseal—A Unit of Mark Controls Corporation, .Soft Seat Valve.
Has–Mor Industries, Inc., .Teflon Encapsulated O–Rings.
Row, Inc., Specialists in Chemically–Resistant, Resilient Teflon* O–Rings.

*Primary Examiner*—John Fox
*Attorney, Agent, or Firm*—Dinsmore & Shohl LLP

[57] ABSTRACT

A composite sealing unit for sealing between moving parts in a valve is disclosed. The sealing unit has a sealing portion that interfaces with the moving parts and is adapted to isolate a reinforcing portion from media within the valve. The reinforcing portion, which can be encapsulated within the sealing unit, is operative to enhance the resiliency of the sealing unit.

22 Claims, 3 Drawing Sheets

COMPOSITE VALVE SEAL

This is a continuation of application Ser. No. 08/582,304, filed Jan. 3, 1996, now abandoned.

TECHNICAL FIELD

The present invention relates generally to seals in valves, and more particularly to composite seals in valves. The invention will be specifically disclosed in connection with a sealing unit for a valve that includes a first portion for enhancing the resiliency of the sealing unit and a second portion for isolating the first portion from media flowing through the valve.

BACKGROUND

Particularly in industrial settings, valves are used to carry and control a variety of gases, liquids and slurries over a wide range of temperatures and pressures. Many types of valves have emerged to meet the broad range of industrial applications. Some typical types of valves include plug valves, ball valves, butterfly valves, gate valves, check valves, etc. Often, when valves are intended to carry reactive chemicals or otherwise harsh media, the valves are built from exotic metals and materials. An alternative design to carry reactive chemicals or harsh media is to fully line the interior of a valve with a protective coating formed from a chemically inert material. Many valves are hand operated, while other valves have actuators to operate a valve from a remote location or to operate valves that are too large for human users to operate.

Invariably, a valve requires one or more seals to control the media passing through the valve and prevent leakage. Leakage can be categorized as internal or external. Internal leakage refers to fluid flow around a seal and back into the flowpath. An example of internal leakage is a valve in the closed position that nevertheless permits some fluid flow through the valve. On the other hand, external leakage refers to leakage from inside the valve to the external environment. Because the very nature of valves is to control fluid flow, either type of leakage is naturally undesirable.

An example of a typical seal in a plug valve 10 is illustrated in FIG. 1. A sleeve 13 is used to seal between a plug 11 and a valve body 12. Typically, the plug 11 is slightly tapered such that when it is forced down into the body 12, the sleeve 13 is compressed between the plug 11 and the body 12. When a user or actuator turns the stem 16, the plug 11 rotates relative to the body 12 and the sleeve 13. If the plug port 17 is aligned with the flow passage 15, the valve is in the open position and media is permitted to flow through the valve. If the plug port 17 is out of alignment with the flow passage 15, the valve is in the closed position and media is prevented from flowing through the valve. To facilitate tight sealing, the body 12 includes a series of continuous protrusions known as sealing ribs 14a, 14b, which are designed to interface with the sleeve 13. This plug valve 10 illustrates two types of sealing ribs: 1) port ribs 14a that encircle the flow passage 15 for preventing internal leakage, 2) circumferential sealing ribs 14b that encircle the plug 11 for preventing external leakage. Plug valves usually include a top seal (not shown) to further prevent external leakage and a cover (not shown) to hold the valve together.

A common set of materials used in valve seals are fluoroplastics, such as polytetrafluoroethylene ("PTFE"), fluorinated ethylene propylene ("FEP"), and perfluoroalkoxy ("PFA"). These materials offer several desirable characteristics, such as excellent chemical resistance and a low coefficient of friction. The chemical resistance of fluoroplastics permits these seals to retain their sealing integrity in a variety of applications, sometimes involving very aggressive and harsh chemicals. The low coefficient of friction in fluoroplastics facilitates less work on the part of users or actuators to operate the valve. As shown in FIG. 1, seals are often placed between rotating parts, which requires a torque (a rotational force) on the part of the user or actuator to move the parts. The lower the coefficient of friction of the seal material, the lower the torque needed to operate the valve.

Fluoroplastics also have less desirable characteristics. One such less desirable characteristic is its low resiliency, or plastic qualities. Plastic qualities, or plasticity, refers to a state where permanent deformations in the material occur under relatively low loads. For example, lead is a highly plastic material because under relatively low loads it will permanently deform. On the other hand, resilient qualities, or resiliency, refers to an elastic state capable of returning to an original shape after being bent, stretched, or compressed. An example of a resilient material is natural rubber, because after being deformed, it returns to its original state. Resiliency, or the lack thereof in plasticity, can be measured by the modulus of resilience using the equation $\frac{1}{2}(\sigma^2/E)$, where $\sigma$ is stress and E is the modulus of elasticity. Generally speaking, the higher the modulus of resilience, the more resilient the material, and the lower the modulus of resilience, the more plastic the material. Under the typical loads that a valve seal experiences, fluoroplastic materials tend to experience plastic deformations.

Fluoroplastics also experience time-dependant deformations under constant loads, a characteristic that is often referred to as cold flow, creep, or viscoelastic deformation. When fluoroplastic materials are utilized as seals, the breaking torque can be substantially greater than the running torque, an effect that is believed to be caused in part by cold flow. Breaking torque refers to the initial torque needed to operate a valve, whereas running torque refers to the subsequent torque needed to operate a valve. This breaking torque effect, which usually occurs after the seal has been compressed and stationary for a period of time, can be aggravated as the seal load increases.

Another undesirable characteristic of fluoroplastic seals is the fact that these materials have a different rate of thermal expansion than the other materials used in valves. All materials exhibit some degree of thermal expansion, which refers to the effect that dimensions change as temperatures change. When the materials in a valve have different rates of thermal expansion, the sealing ability can be jeopardized. For example, if the media in a valve experiences a drop in temperature, the metal portions will change dimensions at a different rate than the fluoroplastic seal. Because fluoroplastics are not very resilient, such seals cannot compensate for the changed dimensions. As a result, the seal could leak if the valve experiences significant enough temperature fluctuations. The possible loss of sealing can be further aggravated in higher temperature thermal cycling because creep induced plastic flow is exaggerated at such temperatures.

SUMMARY OF THE INVENTION

Accordingly, an object of this invention is to provide an improved seal for sealing moving parts in valves.

An additional object of this invention is to provide an improved seal for sealing moving parts in valves having a reduced operating torque and an excellent chemical resistance.

Another object of this invention is to provide an improved replaceable seal for sealing moving parts in valves having a reduced operating torque and an excellent chemical resistance.

Yet another object of this invention is to achieve the foregoing objects in a sleeve for a sleeved plug valve.

Additional objects, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

To achieve the foregoing and other objects of this invention, one of the preferred embodiments of the invention is a composite sealing unit adapted to provide a seal between a valve body and a rotary plug member in a plug valve. The sealing unit has a sealing portion and a reinforcing portion. The sealing portion is designed to interface with the rotary plug member and is designed to isolate the reinforcing portion from media within the valve. Such isolation can be achieved by encapsulating the reinforcing portion within the sealing portion. The reinforcing portion is designed to enhance the resiliency of the sealing unit when installed in a plug valve. The reinforcing portion can include a compressible fluid. Some of the preferred materials for the composite sealing unit include an elastomer or a resilient structure for the reinforcing section, and a fluoroplastic material for the sealing section.

Another embodiment of the invention is a valve assembly comprising a valve body, a valving member, and a sealing unit. The valve body includes an inlet, an outlet, and a flow passage extending between the inlet and outlet. The valving member is movably disposed in the internal flow passage for selectively controlling fluid flow through the valve assembly. The sealing unit is at least partially interposed between the valving member and the valve body for sealing between the valving member and the valve body. The sealing unit has a first portion that is operative to enhance the resiliency of the sealing unit, and a second portion that encapsulates the first portion.

Still other aspects of the present invention will become apparent to those skilled in the art from the following description of the preferred embodiment, which is simply by way of illustration is one of the best modes contemplated for carrying out the invention. As will be realized, the invention is capable of other different obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with their description serve to explain the principles of the invention. In the drawings:

FIG. 2b shows an oblique view of the reinforcing portion of FIG. 2a;

Reference will now be made in detail to the preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
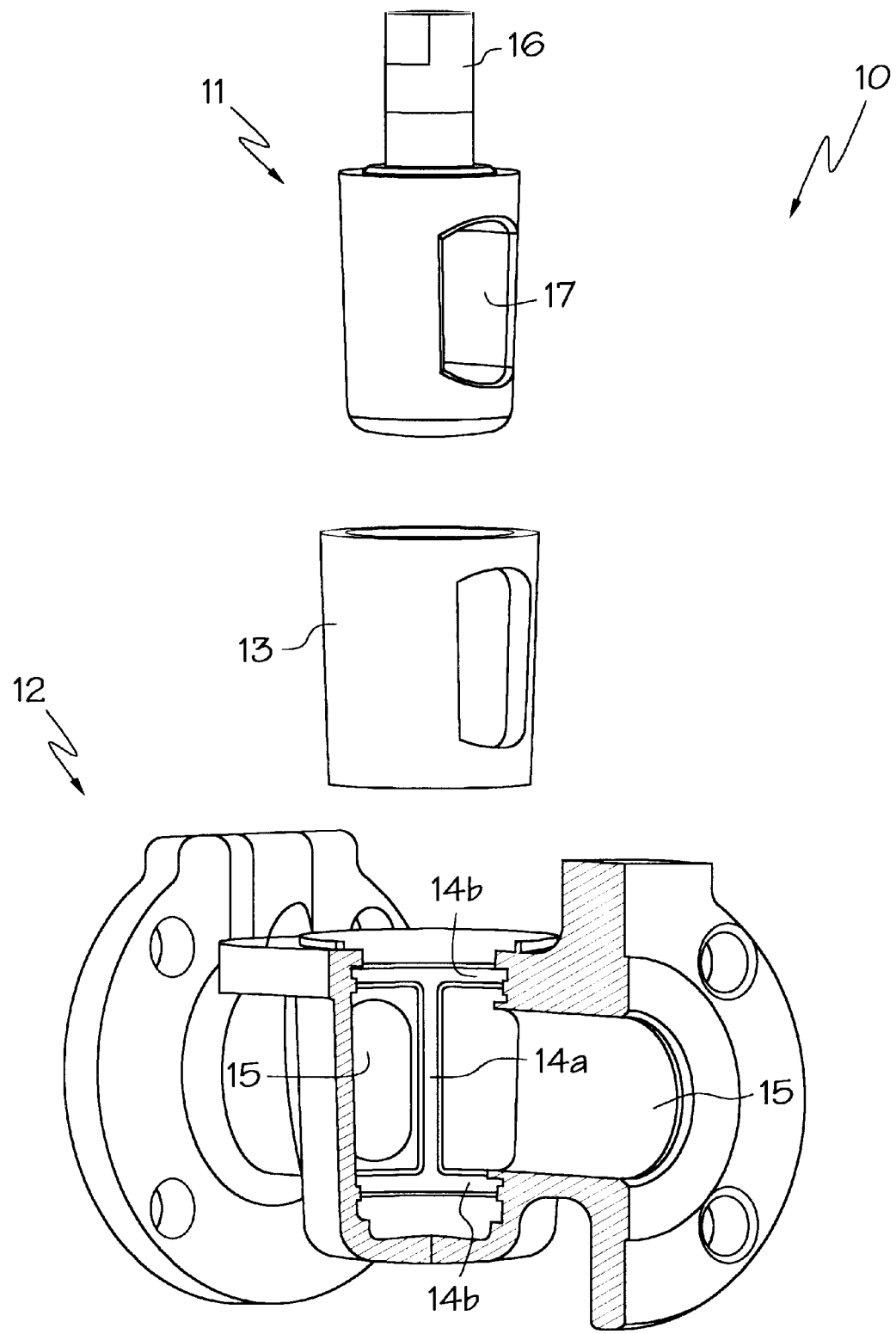
FIG. 1 shows an exploded view of portions of a sleeved plug valve, including a plug, a sleeve, and a quarter-sectioned body.
Figure 2B:
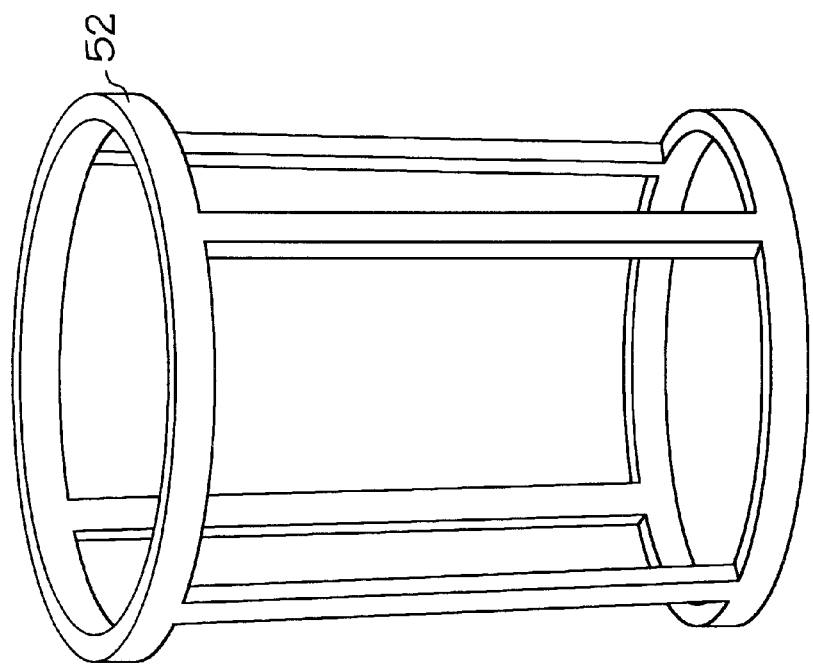
Figure 2A:
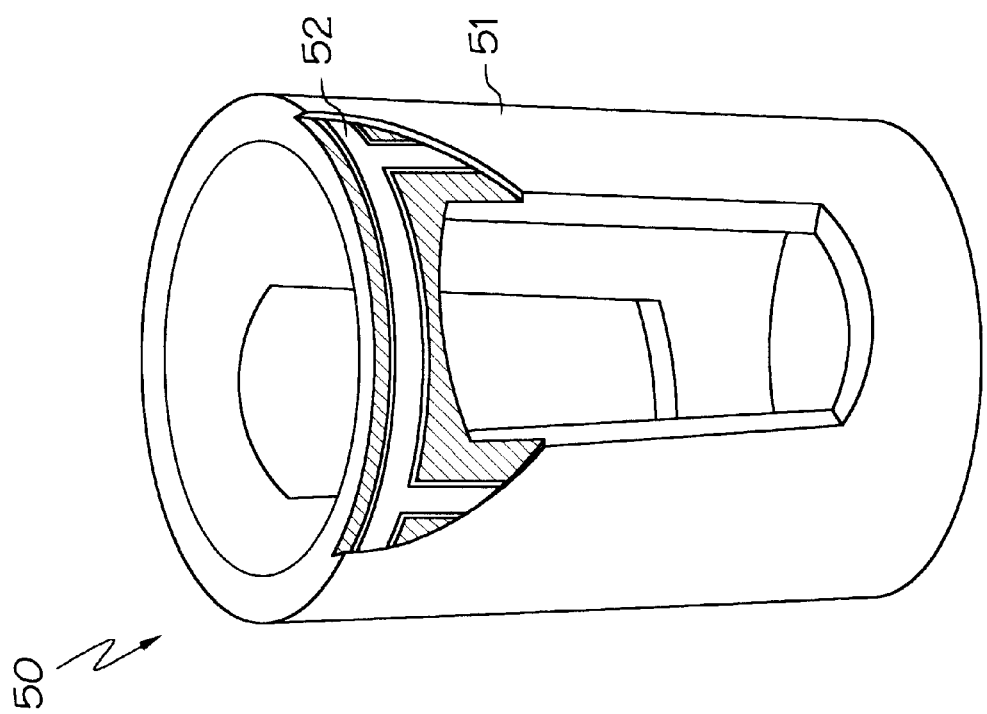
FIG. 2a shows an oblique view of a composite sealing unit that embodies the present invention having a partial cut-away section to illustrate the encapsulated reinforcing portion.

While the present invention has utility in connection with a number of different types of valves, it is particularly advantageous when used with plug valves. FIG. 2a illustrates the invention adapted to be used in a plug valve 10 in which a composite sealing unit 50 is intended to be interchangeable with a standard sleeve 13. The sealing unit 50 is intended to provide a seal between the plug 11 and the body 12. The replacement of such sleeves 13 can be completed in the field, a procedure which does not require the removal of the valve from the pipe line. In this embodiment, the sealing portion 51 completely encapsulates the reinforcing portion 52 to isolate it from the media within the plug valve 10. For the purposes of this specification and claims, encapsulates means to surround or encase a body with a continuous and substantially non-broken surface without significant gaps. A surface is continuous and substantially non-broken if it includes minor discontinuities, such as a vent hole. The sealing portion 51 interfaces with the plug 11 and the sealing ribs 14a, 14b, which when compressed due to the taper of the plug 11, provides a seal between the plug 11 and the body 12. The sealing portion 51 can be formed from any one of a variety of materials, however, fluoroplastics are preferred due to their excellent chemical resistance and low coefficient of friction. Fluoroplastics are also preferred because such materials can be welded or molded around the reinforcing portion 52, thus facilitating the manufacture of the sealing unit 50. Some common examples of suitable fluoroplastics include PTFE, FEP, and PFA.

Figure 3A:
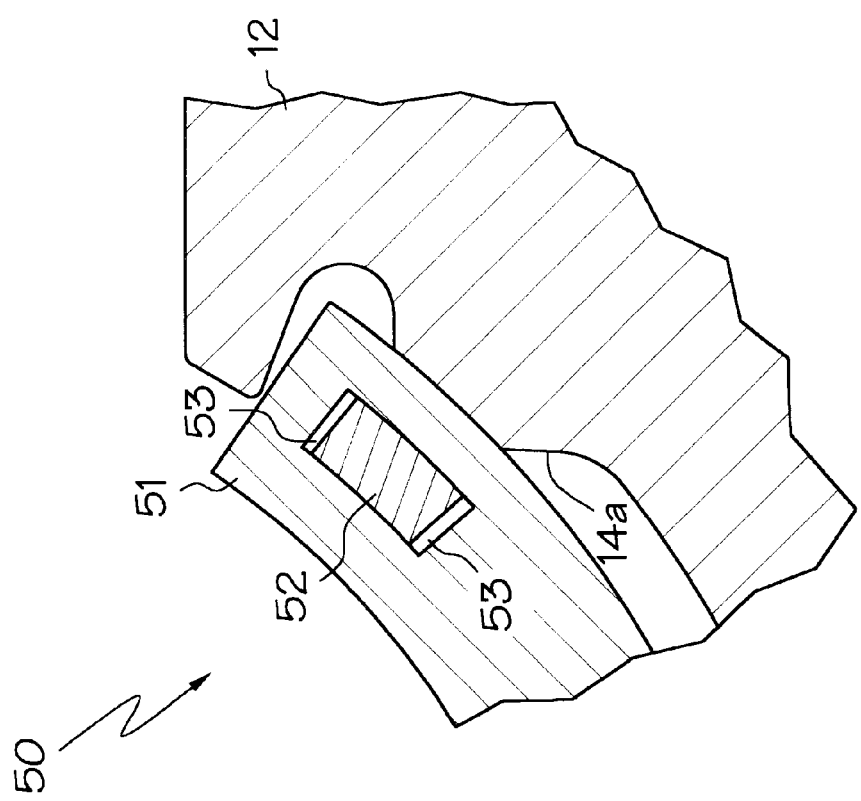
FIG. 3a shows a cross-sectional top view of a portion of the composite sealing unit of FIG. 2a installed in a plug valve under no compression.

The reinforcing portion 52 is operative to enhance the resiliency of the sealing unit 50. FIG. 2b shows the reinforcing portion 52 independent of the sealing portion 51. In this particular embodiment, the reinforcing portion 52 is formed from an elastomer having a rectangular cross-section. When installed in a plug valve 10, the vertical and circular bands of the reinforcing portion 52 are designed to align with the sealing ribs 14a, 14b. FIG. 3a shows the sealing unit 50 installed in a valve body 12 without the plug 11, such that the sealing unit 50 is not under compression. As shown here, the reinforcing portion 52 is substantially aligned with the port sealing ribs 14a. The sealing portion 51 encapsulates the reinforcing portion 52 and leaves a pocket of compressible fluid 53, such as air, which forms part of the reinforcing portion. This pocket of compressible fluid 53 provides a space into which the reinforcing portion 52 may expand once compressed. This pocket 53 can be external to the reinforcing portion 52, as shown here, or internal to the reinforcing portion 52, such as in the form of a hollow-cored reinforcing portion.

Figure 3B:
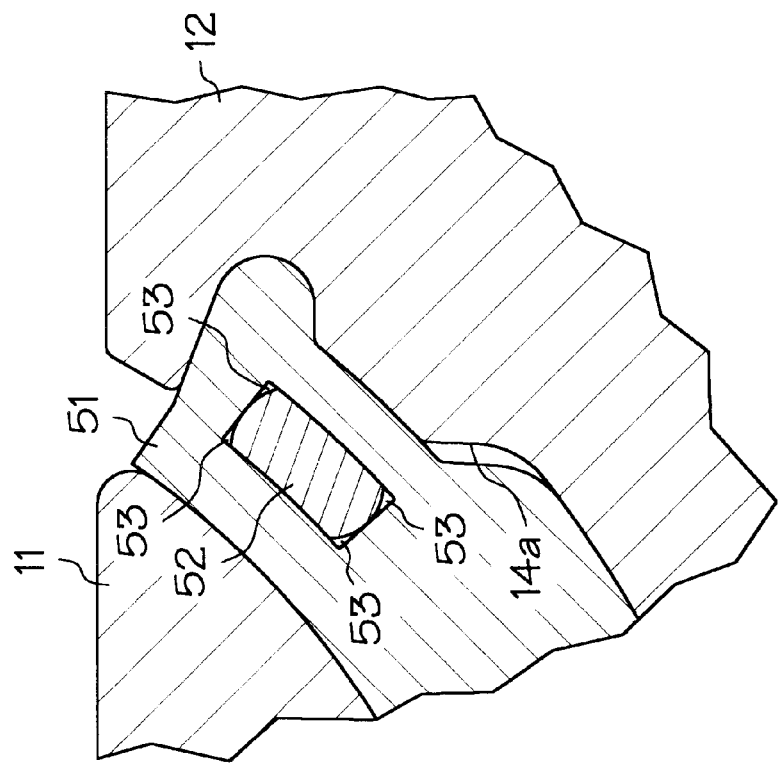
FIG. 3b shows the composite sealing unit of FIG. 3a under compression.

FIG. 3b shows the sealing unit 50 installed in a plug valve 10 with the plug 11, such that the sealing unit 50 is under compression. The reinforcing portion 52 is compressed and has expanded into the pockets of compressible fluid 53. The reinforcing portion 52 exerts a force on the sealing portion 51, thereby providing to the sealing portion 51 a sealing interface with the plug, 11 and the body 12. Because the reinforcing portion 52 is aligned with the port sealing ribs 14a that encircle the flow passage 15, when the plug 11 is in the closed position the sealing unit 50 will provide a seal between the plug 11 and the port sealing ribs 14a, and therefore prevent internal leakage. Similarly, if the circular part of the reinforcing portion 52 aligns with the circumferential sealing ribs 14b, the sealing unit 50 will seal between the plug 11 and those ribs 14b to prevent external leakage. The sealing unit 50 can also be utilized in a body 12 that does not have protrusions 14a, 14b. In such an application, it is preferred that the sealing unit 50 have a variable cross sectional wall thickness such that the wall thickness of the sealing unit 50 that contains the reinforcing portion 52 is thicker than the wall thickness of the sealing unit 50 that is void of the reinforcing portion 52. Because the reinforcing portion 52 enhances the resiliency of the sealing unit 50, the negative effects associated with cold flow and plasticity will be significantly reduced. While the sections of sealing portion 51 between the reinforcing portion 52 and the plug 11 or body 12 may experience some cold flow or plastic characteristics, the changes in dimensions due to such characteristics will be compensated by the resilient nature of the reinforcing portion 52.

As the reinforcing portion 52 is operative to enhance the resilience of the sealing unit 50, it is preferable that the reinforcing portion 52 have a higher modulus of resilience than the sealing portion 51. As demonstrated in the exemplary embodiments described above, this relationship can be achieved by using an elastomer to form the reinforcing portion 52. Some common examples of elastomers that might be used in practicing the invention include rubber, neoprene, fluoroelastomers, silicone, polyurethane, butyl, viton, etc. While the specific elastomer illustrated above had a rectangular cross-section, any number of cross-sections may be employed, such as circular, O-shaped, square, hollow-cored, etc. Beyond elastomers, this relationship can also be achieved by using resilient structures formed from metals, plastics, composites, or any other material. These resilient structures also can have a variety of cross-sectional shapes, such as O-shaped, V-shaped, Z-shaped, W-shaped, diamond shaped, diagonal shaped, etc. Such resilient structures, if formed from a high temperature material like steel, have the additional benefit of enhancing the sealing capabilities of the valve during fire conditions. As another suitable structure, a matrix or lattice formed from the sealing portion 51 material interspersed with a compressible fluid could comprise the reinforcing portion 52, and thereby achieve the desired relationship in the sealing unit 50. Furthermore, the resilient qualities of the reinforcing portion 52 could be provided, in whole or in part, by a pressurized fluid. Such a fluid can be compressible or incompressible.

While the preferred embodiment has been illustrated in the context of a sleeve for a plug valve, the present invention can also be applied in a variety of other seal configurations. For instance, the present invention can be applied in a lined plug valve to seal between the plug and the body, wherein a reinforcing portion is interposed between the liner and the body, or alternatively between the liner and the plug, wherein the liner isolates the reinforcing portion from the media and the reinforcing portion enhances the resiliency of the sealing unit. Furthermore, the present invention can be applied in other types of valves. For example, a composite sealing unit can be used to seal between the disk and body of a butterfly valve, wherein a sealing portion encapsulates a reinforcing portion, thereby isolating it from the media, and the reinforcing portion enhances the resiliency of the sealing unit. As a further example, a similar composite sealing unit can be applied to seal between the ball and body in a ball valve, wherein a sealing portion encapsulates a reinforcing portion thereby isolating it from the media, and the reinforcing portion enhances the resiliency of the sealing unit.

The foregoing description of the preferred embodiment of the invention has been presented for purposes of illustration and description. It is not intended to be exhaustive nor to limit the invention to the precise form disclosed. Many alternatives, modifications and variations will be apparent to those skilled in the art in light of the above teaching. Accordingly, this invention is intended to embrace all such alternatives, modifications and variations that fall within the spirit and broad scope of the appended claims.

We claim:

1. A plug valve assembly, comprising:
    a) a valve body having an inlet, an outlet, and an internal flow passage extending between the inlet and outlet;
    b) a plug having a port, said plug being movably disposed in the internal flow passage of the valve body for selectively controlling media flow through the internal passage; and
    c) a sleeve at least partially interposed between the plug and the valve body for sealing between the pig and the valve body, said sleeve having a first portion and a second portion, said first portion being encapsulated within said second portion to isolate the first portion from media in the valve assembly, said first portion being operative to enhance the resiliency of the sleeve.

2. A plug valve assembly as recited in claim 1, wherein the first portion of the sleeve is at least partially formed of an elastomer.

3. A plug valve assembly as recited in claim 1, wherein the first portion of the sleeve is at least partially formed of a resilient structure.

4. A plug valve assembly as recited in claim 1, wherein the first portion of the at least partially includes a fluid.

5. A plug valve assembly as recited in claim 1, wherein the second portion of the sleeve is at least partially formed of a fluoroplastic material.

6. A plug valve assembly as recited in claim 1, wherein the plug is tapered.

7. A plug valve assembly as recited in claim 1, further comprising sealing ribs in the valve body.

8. A plug valve assembly as recited in claim 7, wherein the first portion of the sleeve is aligned with the sealing ribs.

9. A plug valve assembly, comprising:
    a) a valve body having an inlet, an outlet, and an internal flow passage extending between the inlet and outlet;
    b) a plug having a port, said plug being rotatably disposed in the internal flow passage of the valve body for selectively controlling media flow through the internal passage; and
    c) a sleeve at least partially interposed between the plug and the valve body for sealing between the plug and the valve body, said sleeve having a first portion and a second portion, said first portion being operative to enhance the resiliency of the sleeve, said second portion being adapted to isolate the first portion from media in the valve assembly wherein the first portion is encapsulated within the second portion.

10. A plug valve assembly as recited in claim 9, wherein the first portion of the sleeve is at least partially formed of an elastomer.

11. A plug valve assembly as recited in claim 9, wherein the first portion of the sleeve is at least partially formed of a resilient structure.

12. A plug valve assembly as recited in claim 9, wherein the first portion of the sleeve at least partially includes a fluid.

13. A plug valve assembly as recited in claim 9, wherein the second portion of the sleeve is at least partially formed of a fluoroplastic material.

14. A plug valve assembly as recited in claim 9, wherein the plug has an open position and a closed position, and the sleeve encircles the internal flow passage, whereby when the plug is in the closed position the sleeve prevents the flow of fluid from the inlet to the outlet.

15. A plug valve assembly as recited in claim 9, wherein the sleeve encircles the plug for containing fluid in the valve assembly.

16. A plug valve assembly as recited in claim 9, wherein the valve body further includes at least one continuous protrusion adapted to engage at least a portion of the sleeve.

17. A sleeve adapted to provide a seal between a valve body and a rotary plug member in a plug valve, said sleeve comprising a sealing portion and a resilient reinforcing portion encapsulated within the sealing portion, said sealing portion being adapted to interface with the rotary plug member, said reinforcing portion being operative to enhance the resiliency of the sleeve with said sealing portion being adapted to isolate, when installed in a plug valve, the reinforcing portion from media in the plug valve.

18. A sleeve as recited in claim 17, wherein the reinforcing portion of the sleeve is at least partially formed of an elastomer.

19. A sleeve as recited in claim 17, wherein the reinforcing portion of the sleeve is at least partially formed of a resilient structure.

20. A sleeve as recited in claim 17, wherein the reinforcing portion of the sleeve at least partially includes a fluid.

21. A sleeve as recited in claim 17, wherein the sealing portion of the sleeve is at least partially formed of a fluoroplastic material.

22. A sleeve as recited in claim 17, wherein the sleeve has a variable cross sectional wall thickness.

* * * * *

UNITED STATES PATENT AND TRADEMARK OFFICE
CERTIFICATE OF CORRECTION

PATENT NO. : 5,901,944
DATED : May 11, 1999
INVENTOR(S) : M. R. Ramakrishnan, Michael J. Sandling, M. Kirk It is certified that error appears in the above-indentified patent and that said Letters Patent is hereby corrected as shown below:

Claim 1, line 21, change [pig] to -- plug --.

Claim 4, line 34, change [the at ] to -- the sleeve at --.

Signed and Sealed this

Twenty-sixth Day of October, 1999

Attest:

Q. TODD DICKINSON

Attesting Officer

Acting Commissioner of Patents and Trademarks